United States Patent
Gascon et al.

(10) Patent No.: US 11,478,784 B2
(45) Date of Patent: Oct. 25, 2022

(54) CATALYST COMPOSITIONS FOR AMMONIA DECOMPOSITION

(71) Applicants: Saudi Arabian Oil Company, Dhahran (SA); King Abdullah University of Science and Technology, Thuwal (SA)

(72) Inventors: Jorge Gascon, Thuwal (SA); Salvador Sayas, Thuwal (SA); Natalia Morlanes, Thuwal (SA); Sai Katikaneni, Dhahran (SA); Aadesh Harale, Dhahran (SA); Bandar Solami, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 185 days.

(21) Appl. No.: 16/781,843

(22) Filed: Feb. 4, 2020

(65) Prior Publication Data
US 2021/0237046 A1   Aug. 5, 2021

(51) Int. Cl.
*B01J 23/10* (2006.01)
*B01J 23/78* (2006.01)
(Continued)

(52) U.S. Cl.
CPC .............. *B01J 37/031* (2013.01); *B01J 23/10* (2013.01); *B01J 23/78* (2013.01); *B01J 35/023* (2013.01);
(Continued)

(58) Field of Classification Search
CPC .................................. B01J 23/10; B01J 23/78
See application file for complete search history.

(56) References Cited

U.S. PATENT DOCUMENTS

| 3,216,954 A | 11/1965 | Howk et al. |
| 7,229,945 B2 | 6/2007 | Kauffman |

(Continued)

FOREIGN PATENT DOCUMENTS

| AU | 4466799 A | | 3/2000 |
| CN | 109772339 A | * | 5/2019 |

(Continued)

OTHER PUBLICATIONS

AzoHAaccnt (What is TPR, May 1, 2018, Hiden analytical).*

(Continued)

*Primary Examiner* — Jun Li
(74) *Attorney, Agent, or Firm* — Bracewell LLP; Constance G. Rhebergen; Eleanor L. Tyson

(57) ABSTRACT

A method for ammonia decomposition to produce hydrogen, the method comprising the steps of introducing an ammonia stream to a reactor, wherein the ammonia stream comprises ammonia, wherein the reactor comprises a cobalt-based catalyst, the cobalt-based catalyst comprising 15 wt % and 70 wt % of cobalt, 5 wt % and 45 wt % of cerium, and 0.4 wt % and 0.5 wt % barium, wherein a remainder of weight of the cobalt-based catalyst is oxygen; contacting the ammonia in the ammonia stream with the cobalt-based catalyst, wherein the cobalt-based catalyst is operable to catalyze an ammonia decomposition reaction; catalyzing the ammonia decomposition reaction to cause the ammonia decomposition in the presence of the cobalt-based catalyst to produce hydrogen; and withdrawing a product stream from the reactor, the product stream comprising hydrogen.

4 Claims, 8 Drawing Sheets

(51) Int. Cl.

| | |
|---|---|
| *B01J 35/02* | (2006.01) |
| *C01B 3/04* | (2006.01) |
| *B01J 37/03* | (2006.01) |
| *B01J 37/00* | (2006.01) |
| *B01J 37/02* | (2006.01) |
| *B01J 37/04* | (2006.01) |
| *B01J 37/06* | (2006.01) |
| *B01J 37/08* | (2006.01) |

(52) U.S. Cl.
CPC ......... *B01J 37/009* (2013.01); *B01J 37/0201* (2013.01); *B01J 37/0236* (2013.01); *B01J 37/04* (2013.01); *B01J 37/06* (2013.01); *B01J 37/088* (2013.01); *C01B 3/047* (2013.01)

(56) References Cited

U.S. PATENT DOCUMENTS

| | | | |
|---|---|---|---|
| 8,557,729 B2 | 10/2013 | Cairns et al. | |
| 2012/0015802 A1* | 1/2012 | Okamura | C01B 3/06 502/305 |
| 2013/0058862 A1* | 3/2013 | Okamura | B01J 37/0201 423/658.2 |
| 2017/0087537 A1* | 3/2017 | Zhang | B01J 23/002 |
| 2018/0345217 A1 | 12/2018 | Goffe | |
| 2019/0210009 A1 | 7/2019 | Okamura et al. | |

FOREIGN PATENT DOCUMENTS

| | | |
|---|---|---|
| JP | 5483705 B2 | 5/2014 |
| JP | 5761710 B2 | 8/2015 |
| JP | 2017050180 A | 3/2017 |
| JP | 2019011212 A | 1/2019 |
| PL | 216899 A1 | 5/2014 |
| WO | 2010060736 A1 | 6/2010 |
| WO | 2018205787 A1 | 11/2018 |

OTHER PUBLICATIONS

Machine translation of Eguchi (JP2019-011212A), publication date Jan. 24, 2019.*

Machine English Translation of PL 216 899 B1, Publication date of May 30, 2014, 5 pages.

PCT ISRWO issued in the prosecution of International application PCT/US2021/016328, dated May 11, 2021, 15 pages.

Wioletta Rarog-Pilecka et al., "Cobalt Catalyst Doped With Cerium and Barium Obtained by Co-Precipitation Method fo Ammonia Synthesis Process", Catalysis Letters, vol. 141, XP019898098, No. 5, NE, Feb. 26, 2011, pp. 678-684.

Aleksandra Tarka et al., Effect of Precipitating Agent on the Properties of Cobalt Catalysts Promoted with Cerium and Barium for NH3 synthesis obtained by co-precipitation 532 Applied Catalysis A: General 19-25 (2017).

T.E. Bell et al., H2 Production via Ammonia Decomposition Using Non-Noble Metal Catalysts: A Review, 59 Top Catal. 1438-1457(2016).

* cited by examiner

CATALYST COMPOSITIONS FOR AMMONIA DECOMPOSITION

TECHNICAL FIELD

Disclosed are compositions and methods related to catalyst formulations. Specifically, disclosed are compositions and methods for catalyst formulations to decompose ammonia.

BACKGROUND

Ammonia is a high-volume commercial chemical with global production of 176 million tons in 2014. Ammonia has emerged as an efficient hydrogen carrier due to its high volumetric energy density (108 kg-$H_2$/$m^3$ $NH_3$ at 20° C. and 8.6 bar) and gravimetric energy density (17.8 wt. %). In addition, ammonia is easy to store and transport. These benefits make ammonia suitable for the onsite generation of COx-free hydrogen by its catalytic decomposition, which can be used for fuel-cells or hydrogen-powered vehicles.

Current methods of decomposing ammonia include the use of ruthenium catalysts on carbon nanotube supports (Ru/CNT). Ru-based catalysts are cost prohibitive for large scale commercialization of such processes. Additionally, CNT as a support lacks stability. A methanation reaction can occur over the carbon-based catalysts at the reaction conditions required for ammonia decomposition, such as temperature of about 450 degrees Celsius (° C.). The methanation reaction can involve the hydrogenation of the carbon in carbon-based catalysts, resulting in the deactivation of the catalyst.

SUMMARY

Disclosed are compositions and methods related to catalyst formulations. Specifically, disclosed are compositions and methods for catalyst formulations to decompose ammonia.

In a first aspect, a method for ammonia decomposition to produce hydrogen is provided. The method includes the steps of introducing an ammonia stream to a reactor, wherein the ammonia stream includes ammonia, wherein the reactor includes a cobalt-based catalyst, the cobalt-based catalyst includes 15 wt % and 70 wt % of cobalt, 5 wt % and 45 wt % of cerium, and 0.4 wt % and 0.5 wt % barium, wherein a remainder of weight of the cobalt-based catalyst is oxygen. The method further includes contacting the ammonia in the ammonia stream with the cobalt-based catalyst, wherein the cobalt-based catalyst is operable to catalyze an ammonia decomposition reaction, catalyzing the ammonia decomposition reaction to cause the ammonia decomposition in the presence of the cobalt-based catalyst to produce hydrogen, and withdrawing a product stream from the reactor, the product stream includes hydrogen.

In certain aspects, the method further includes the steps of introducing a flow of hydrogen gas to the reactor, increasing a temperature in the reactor to 500° C. at a rate of 2° C. per minute, and maintaining the temperature in the reactor at 500° C. for at least 3 hours to activate metal sites on the cobalt-based catalyst prior to the step of introducing the ammonia stream to the reactor.

In certain aspects, a temperature in the reactor is in a range between 250° C. and 700° C. In certain aspects, a pressure in the reactor is in a range between 1 bar and 40 bar. In certain aspects, the product stream further includes nitrogen. In certain aspects, the conversion of ammonia is greater than 95%.

In a second aspect, a method of preparing a cobalt-based catalyst is provided. The method includes the steps of dissolving cobalt nitrate hexahydrate ($Co(NO_3).6H_2O$) and cerium nitrate hexahydrate ($Ce(NO_3).6H_2O$) in distilled water, adding a sodium carbonate ($Na_2CO_3$) solution, maintaining the solution until cobalt and cerium carbonates precipitate from the solution, filtering the cobalt and cerium carbonates under pressure of about 0.4 bar, washing the filtered cobalt and cerium carbonates using cold distilled water until the pH is 7 to produce the washed precipitate, drying the washed precipitate at a temperature of 100° C. for at least 8 hours to produce a dried precipitate, calcining the dried precipitate at a temperature of 550° C. for at least 3 hours to produce a black powder, wherein the temperature of the calcining step is operable to burn out the carbonate to produce the black powder includes a composite oxide of Co3O4/CeO2, impregnating the black powder with an aqueous solution of barium nitrate ($Ba(NO_3)2$) to produce a precursor, drying the precursor at a temperature of 120° C. for at least 8 hours to produce a dried precursor, and calcining the dried precursor at a temperature of 550° C. for at least 3 hours to produce the cobalt-based catalyst.

In certain aspects, the method further includes the steps of crushing the cobalt-based catalyst to produce particles of the cobalt-based catalyst, sieving the particles, and collecting the particles of the cobalt-based catalyst with a diameter between 0.3 mm and 0.5 mm. In certain aspects, the cobalt-based catalyst includes 15 wt % and 70 wt % of cobalt, 5 wt % and 45 wt % of cerium, and 0.4 wt % and 0.5 wt % barium, wherein a remainder of weight of the cobalt-based catalyst is oxygen.

In a third aspect, a cobalt-based catalyst composition is provided. The cobalt-based catalyst composition includes 15 wt % and 70 wt % of cobalt, 5 wt % and 45 wt % of cerium, and 0.4 wt % and 0.5 wt % barium, wherein a remainder of weight of the cobalt-based catalyst is oxygen.

In certain aspects, the cobalt-based catalyst composition includes cobalt oxide. In certain aspects, the cobalt-based catalyst composition includes cerium oxide. In certain aspects, the cobalt is an active metal. In certain aspects, the cerium is operable to act as a support and as a promoter.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

While the scope will be described with several embodiments, it is understood that one of ordinary skill in the relevant art will appreciate that many examples, variations and alterations to the apparatus and methods described here are within the scope. Accordingly, the embodiments described are set forth without any loss of generality, and without imposing limitations, on the embodiments. Those of skill in the art understand that the scope includes all possible combinations and uses of particular features described in the specification.

Described here are compositions and methods related to catalyst formulations for use in decomposing ammonia to produce nitrogen and hydrogen. The catalyst formulations are cobalt-based catalysts. Advantageously, the cobalt-based catalysts can be used for on-demand hydrogen production from ammonia. Advantageously, the cobalt-based catalysts are stable exhibit consistent catalytic performance with no deactivation observed over the long-term.

As used throughout, "in the absence" means the composition or method does not include, does not contain, is without.

As used throughout, "promoter" means a component in a catalyst that improves the performance of the catalyst in the catalyzed reactions, but alone has little or no catalytic effect. Promoters can impact the structural and physical properties of the catalyst. Promoters can interact with active components of a catalyst and alter the chemical effect of the active component on the catalyzed substance.

The cobalt-based catalysts can include a cobalt component, a cerium component, and a barium component. The cobalt-based catalysts are composite oxides. The catalyst activity of the cobalt-based catalysts depends on the active metal sites, which is related to the dispersion of the active metal component.

The cobalt component is the active metal component of the cobalt-based catalysts. The ammonia decomposition reaction occurs over the cobalt component. The cobalt component can be present as cobalt metal or cobalt oxide in the form of $Co_3O_4$. The amount of cobalt present in cobalt-based catalyst can be in the range between about 15 wt % and 70 wt %, alternately between 25 wt % and 70 wt %, alternately between 30 wt % and 70 wt %, alternately between 35 wt % and 70 wt %, and alternately 40 wt % and 70 wt %. The amount of cobalt metal is the same regardless of whether the cobalt component is present as cobalt metal or as a cobalt oxide. The particle size of the cobalt component can be in the range between 20 nanometers (nm) and 30 nm.

Figure 1:
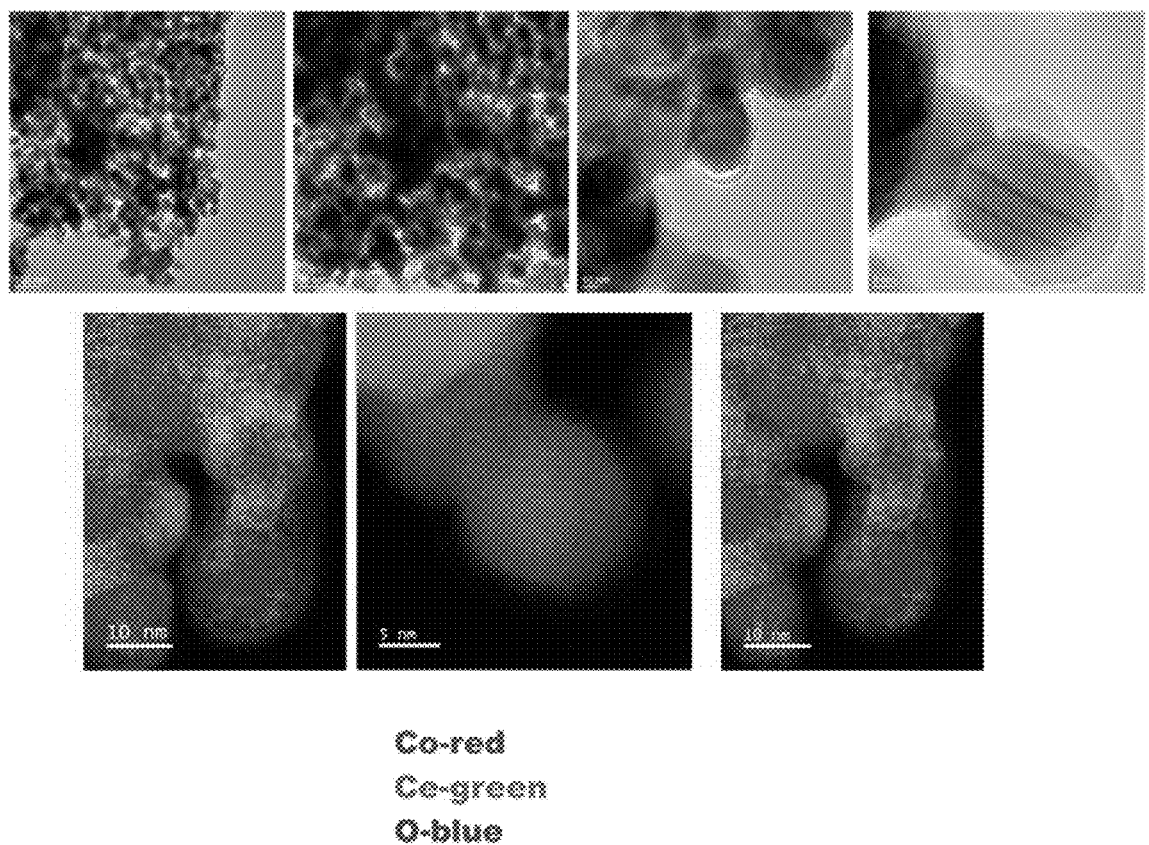
FIG. 1 is a TEM image of the particles of a cobalt-containing catalyst.
Figure 2:
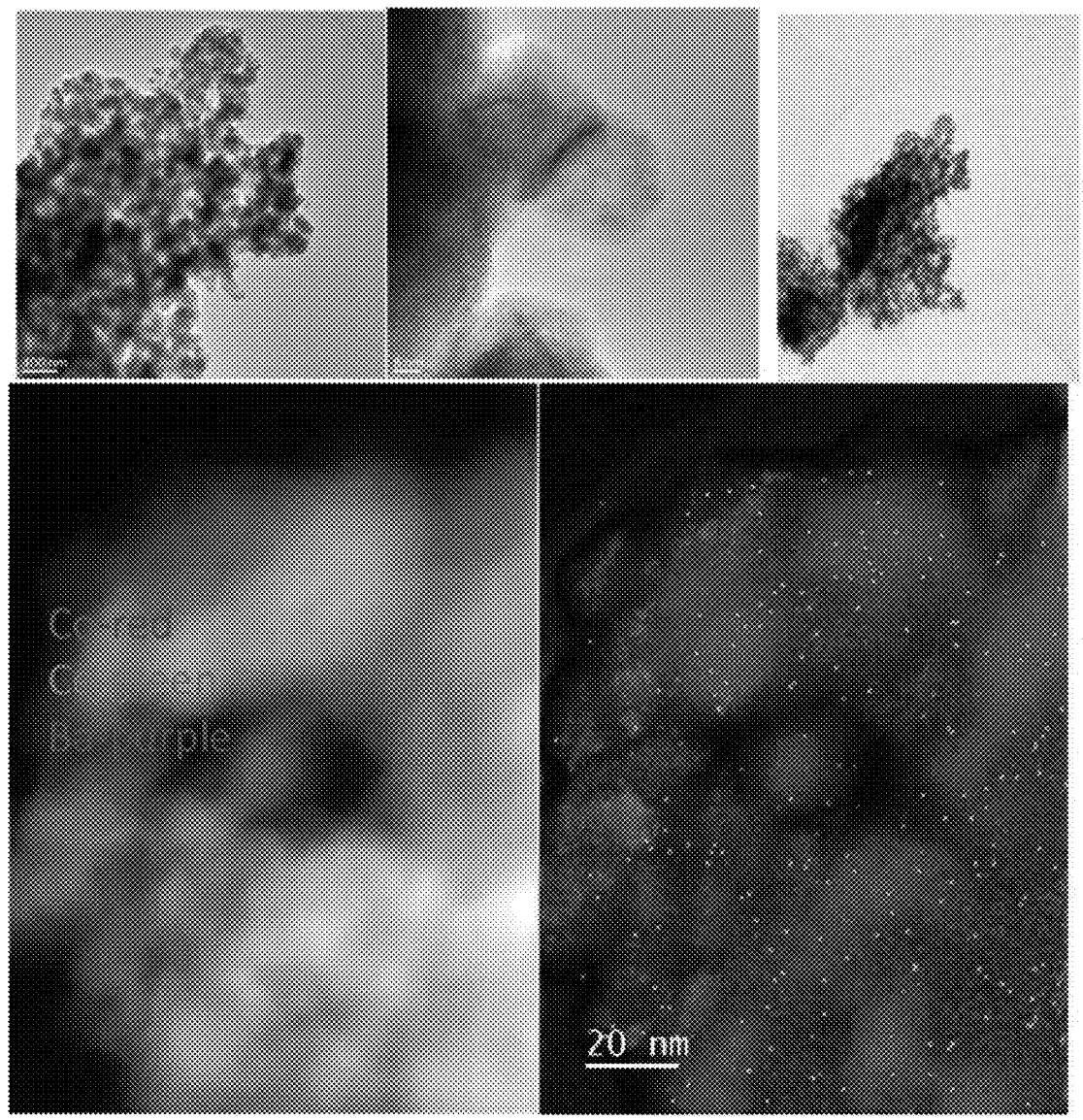
FIG. 2 is a TEM image of the particles of a cobalt-based catalyst.

The cerium component can serve a dual purpose of promoter and support. The cerium component prevents the agglomeration of cobalt and, thus, increases the dispersion of the cobalt particles in the cobalt-based catalysts. The cobalt dispersion can be about 5%. The cerium component can be highly dispersed, which can reduce the size of the cobalt particles. The dispersion of cerium can be observed in the transmission electron microscopy (TEM) images of FIG. 1 and FIG. 2, which show the agglomerates of cerium between and on top of the particles of the cobalt component. FIG. 2 shows single atoms of cerium on the cobalt component particles. The cerium component can include cerium oxide in the form of $CeO_2$. The amount of cerium present in the cobalt-based catalyst can be in the range between 5 wt % and 45 wt % and alternately between 7 wt % and 42 wt %.

The barium component can serve as a promoter. The cerium component enables the incorporation of the barium component. The addition of the barium component enables dispersion of additional cobalt compared to a catalyst without barium, which increases the catalytic behavior of the cobalt-based catalyst. The barium component can improve catalytic performance. At lower temperatures the inclusion of the barium component can increase conversion of the ammonia. The barium component can include barium. The amount of barium present in the cobalt-based catalyst can be in the range between 0.4 wt % and 0.5 wt %. At amounts of barium greater than 1 wt % in the catalyst, the activity for the ammonia decomposition reaction is drastically decreased. At amounts of barium greater than about 9 wt % in the catalyst, the barium disrupts the catalytic properties of the cobalt and can prevent the ammonia decomposition reaction from occurring.

The cobalt-based catalysts can have a molar ratio of cobalt to cerium in the range from 50 to 95 In at least one embodiment, the cobalt-based catalyst has a cobalt to cerium mass ratio of 63/67 and contains 0.5 wt % barium, with the remainder oxygen. In at least one embodiment, the cobalt-based catalyst contains 41.4 wt % cobalt, 23.5 wt % cerium, 0.5 wt % barium, and the remainder oxygen. In at least one embodiment, the cobalt-based catalyst has a cobalt to cerium mass ratio of 67/37 and contains 0.5 wt % barium with and the remainer oxygen.

The cobalt-based catalysts can be prepared by a combination of co-precipitation and impregnation methods. Advantageously, the use of co-precipitation increases the cobalt loading and improves the physical and structural parameters of the final catalyst, which improves the activity of the final catalyst.

In the co-precipitation stage, cobalt and cerium carbonates were obtained by co-precipitation. In a first step, an amount of cobalt nitrate hexahydrate ($Co(NO_3)_2 \cdot 6H_2O$) and cerium nitrate hexahydrate ($Ce(NO_3)_3 \cdot 6H_2O$) are dissolved in distilled water and warmed to produce a salt-containing solution. The amount of cobalt nitrate hexahydrate can be selected based on the amount of water, the desired composition of the final catalyst, and the desired ratio of cobalt to cerium. The amount of cerium nitrate hexahydrate can be selected based on the amount of water, the desired composition of the cobalt-based catalyst, and the desired ratio of cobalt to cerium. A sodium carbonate ($Na_2CO_3$) solution is then slowly added to the salt-containing solution. The amount of sodium carbonate added is greater than the amount of cobalt nitrate hexahydrate and cerium nitrate hexahydrate so that the cobalt carbonates and cerium carbonates precipitate. The sodium does not become incorporated into the catalyst. The cobalt carbonates and cerium carbonates precipitate from the solution. The obtained cobalt carbonates and cerium carbonates can be filtered under reduced pressure of about 0.4 bar and washed with distilled water until the pH of the wash water is 7. The wash with distilled water can ensure removal of the sodium carbonate. In a drying step, the washed precipitate is dried at a temperature of 100° C. for at least 8 hours to produce a dried precipitate. In a calcining step, the dried precipitate is then calcined at a temperature of 550° C. for about 3 hours. The carbonate burns out during the calcining step to produce a black powder containing a composite oxide, $Co_3O_4/CeO_2$. In the impregnation stage, the black powder is impregnated with an aqueous solution of barium nitrate ($Ba(NO_3)_2$) to produce a precursor. The amount of barium nitrate can be selected to achieve the desired amount of barium. In a drying step, the precursor is dried at a temperature of 120° C. for at least 8 hours to produce a dried precursor. In a calcining step, the dried precursor is calcined at a temperature of about 550° C. for about 3 hours to produce the cobalt-based catalyst. The cobalt-based catalyst can be crushed and sieved. The cobalt-based catalyst can have a size between 0.3 mm and 0.5 mm.

Before being used in ammonia decomposition reactions, the cobalt-based catalyst can be reduced in a reducing step. The temperature of the cobalt-based catalyst can be increased to a temperature of about 500° C. at a rate of 2° C. per minute under flowing hydrogen gas at atmospheric pressure for about 3 hours. The flow rate of hydrogen can be about 25 milliliter per minute. The reducing step can produce active metal sites in the cobalt-based catalysts. The reducing step can be performed in the reactor containing the cobalt-based catalysts.

The cobalt-based catalysts can be used to catalyze ammonia decomposition reactions, which occur according to formula 1.

$$2NH_3 \rightarrow N_2 + 3H_2 \quad \text{Reaction 1}$$

The cobalt-based catalysts can be used for the selective decomposition of ammonia in reaction 1.

The ammonia decomposition reaction is an equilibrium controlled reaction. The cobalt-based catalyst can be loaded in a reactor. The reactor can be any type of vessel capable of containing a catalyst and supporting the operating conditions of an ammonia decomposition reaction. Examples of reactors include fixed reactors and fluidized bed reactors. The ammonia stream containing ammonia can be introduced to the reactor containing the cobalt-based catalyst. The ammonia decomposition reaction can be catalyzed to occur over the cobalt-based catalyst. The ammonia decomposition reaction can produce hydrogen and nitrogen. The gases can be removed from the reactor as a product stream. The product stream can include nitrogen, hydrogen, ammonia, and combinations of the same.

The conversion of ammonia over the cobalt-based catalyst can be greater than 95%, alternately greater than 97%, and alternately greater than 99%. In at least one embodiment, the conversion can be 100%. In at least one embodiment, where conversion is 100%, the product stream can be in the absence of ammonia. Ammonia decomposition reactions can occur at temperatures between about 250° C. and 700° C., alternately between 250° C. and 550° C., and alternately between 350° C. and 550° C. Ammonia decomposition reactions can occur at pressures between 1 bar and 40 bar, alternately between 1 bar and 30 bar, alternately between 1 bar and 20 bar, and alternately between 1 bar and 10 bar.

The cobalt-based catalysts are in the absence of noble metals. The cobalt-based catalysts are in the absence of manganese, nickel, copper, iron, ruthenium, palladium, platinum, magnesium, strontium, yttrium, lanthanum, neodymium, samarium, europium, gadolinium, and erbium. The cobalt-based catalysts are in the absence of a perovskite structure.

EXAMPLE

Example 1

The cobalt-based catalyst was prepared by a co-precipitation method and an impregnation method.

In the co-precipitation stage, cobalt and cerium carbonates were obtained by co-precipitation. Sodium carbonate was used as the precipitant. Between 1.82 grams (g) and 3.46 g of $Co(NO_3)_2 \cdot 6H_2O$ and between 0.27 g and 2.71 g $Ce(NO_3)_2 \cdot 6H_2O$ (SIGMA-ALDRICH®, St. Louis, Mo.) were dissolved in distilled water and warmed to reach 0.0125 mol of each compound, cobalt and cerium. Then, a warm solution of 2.65 g of $Na_2CO_3$ (SIGMA-ALDRICH®, St. Louis, Mo.) was slowly added over 1 minute. The obtained co-precipitate containing cobalt carbonate and cerium carbonate was filtered under reduced pressure of about 0.4 bar and washed with cold distilled water several times until the pH of the collected wash water was equal to 7.

The washed precipitates were dried at 100° C. overnight and calcined for 3 h at 550° C. to produce a black powder of cobalt oxide or 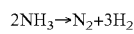/$CeO_2$ composite oxides.

The black powder was then impregnated using an aqueous solution of barium nitrate (SIGMA-ALDRICH®, St. Louis, Mo.) to achieve a nominal concentration of 0.5 wt % in a precursor.

The resulting precursor was then dried at 120° C. overnight and then subsequently calcined at 550° C. for 3 h to produce the cobalt-based catalyst.

The cobalt-based catalyst was crushed and sieved to obtain the 0.3-0.5 mm fraction of the cobalt-based catalyst particles.

The structural and chemical analysis of the cobalt-based catalyst was performed, followed by evaluation of the catalytic performance. The determination of the structural parameters was performed by $N_2$ and CO chemisorption, X-Ray diffraction, XPS, and HR-TEM. The high resolution TEM images shown in FIG. 1 and FIG. 2 show that the cobalt and cerium are in nanoparticle size and well dispersed. FIG. 1 shows TEM images of a cobalt-based catalyst containing 63% Co, 37% Ce after a reducing step. FIG. 2 shows TEM images of a cobalt-based catalyst containing 0.5% Ba/63% Co, 37% Ce after a reducing step. FIG. 2 also shows that barium is well dispersed. The chemical composition was obtained using ICP.

Example 2

Figure 3:
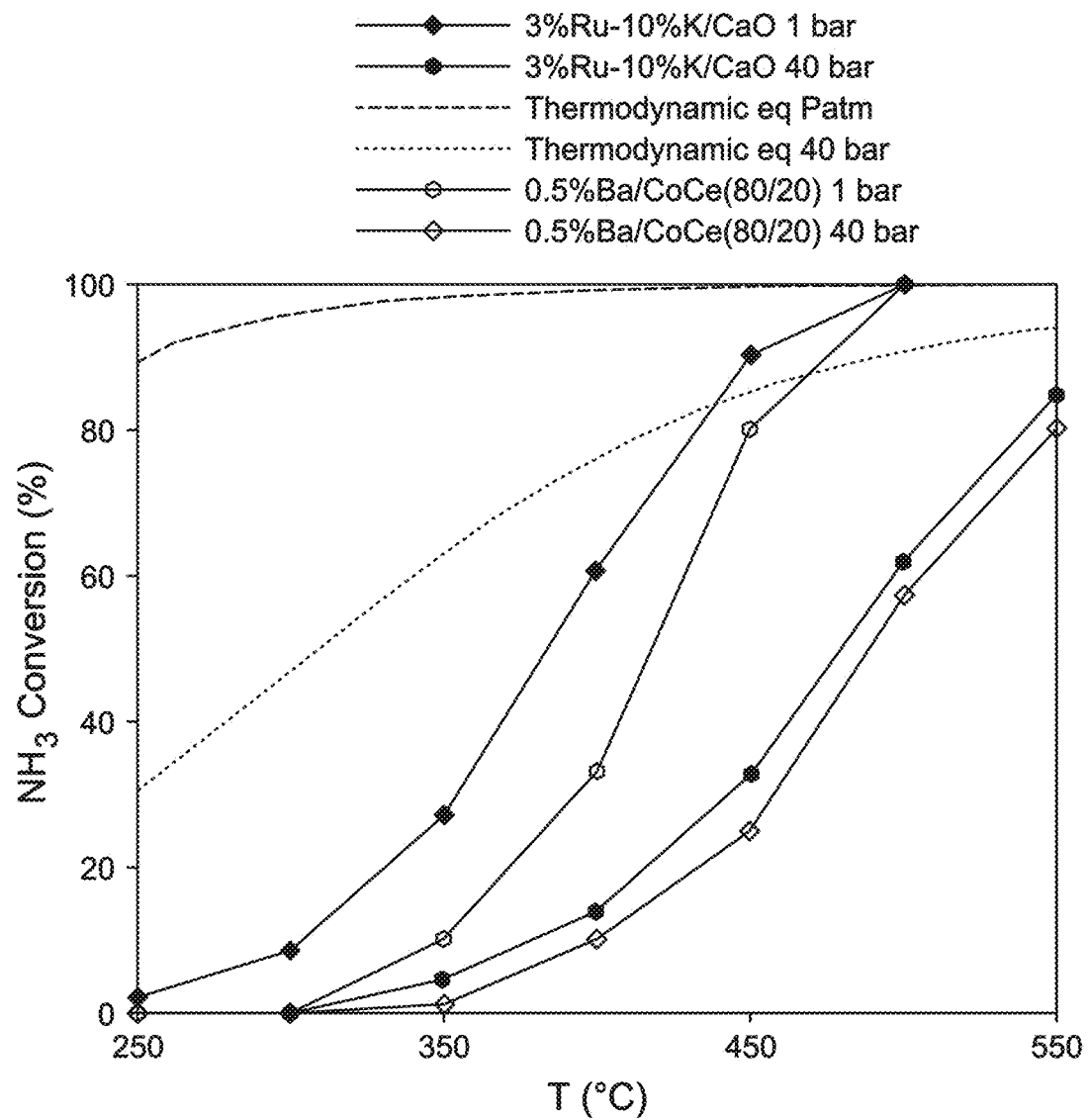
FIG. 3 is a graph comparing a commercially available 3% Ru-10% K/CaO catalyst and a cobalt-based catalyst of 0.5% Ba/80% Co-20% Ce at 1 bar and at 40 bar.

Cobalt-based catalysts were prepared according to the method of claim 1 contained 0.5% Ba/80% Co-20% Ce. The catalytic performance of the cobalt-based catalyst was tested in a fixed bed reactor (PID technology) at temperatures between 250° C. and 550° C. at three different pressures 1 bar, 20 bar, and 40 bar. For comparison, the catalytic performance of a 3% Ru-10% K/CaO commercially available catalyst was tested using the same methodology. The results can be seen in FIG. 3. The best catalytic performances are achieved at temperatures greater than 500° C. at 1 bar.

Example 3

Figure 4:
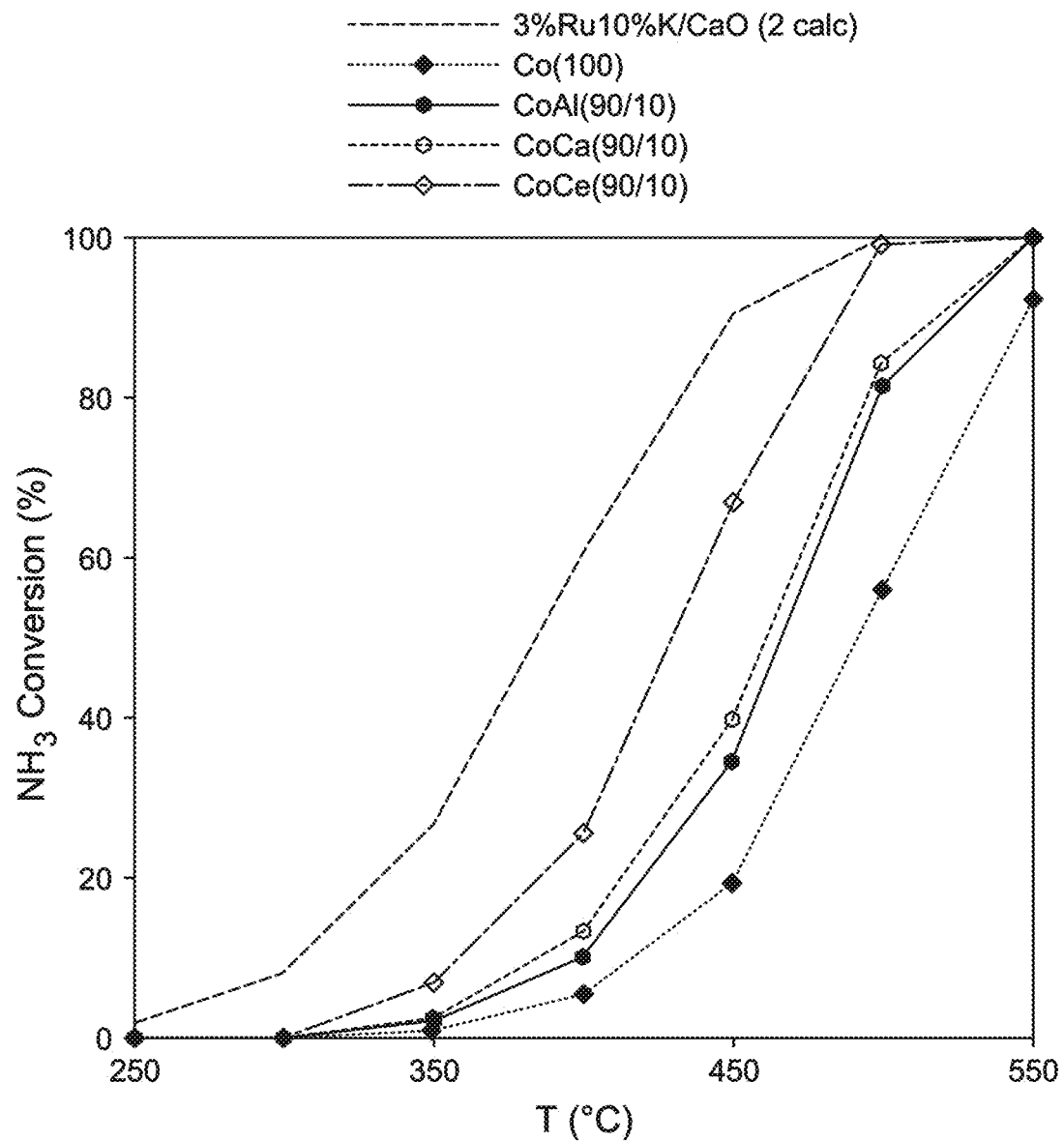
FIG. 4 is a graph showing the effect of promoters (Ca, Al, Ce) in cobalt containing catalysts.
Figure 5:
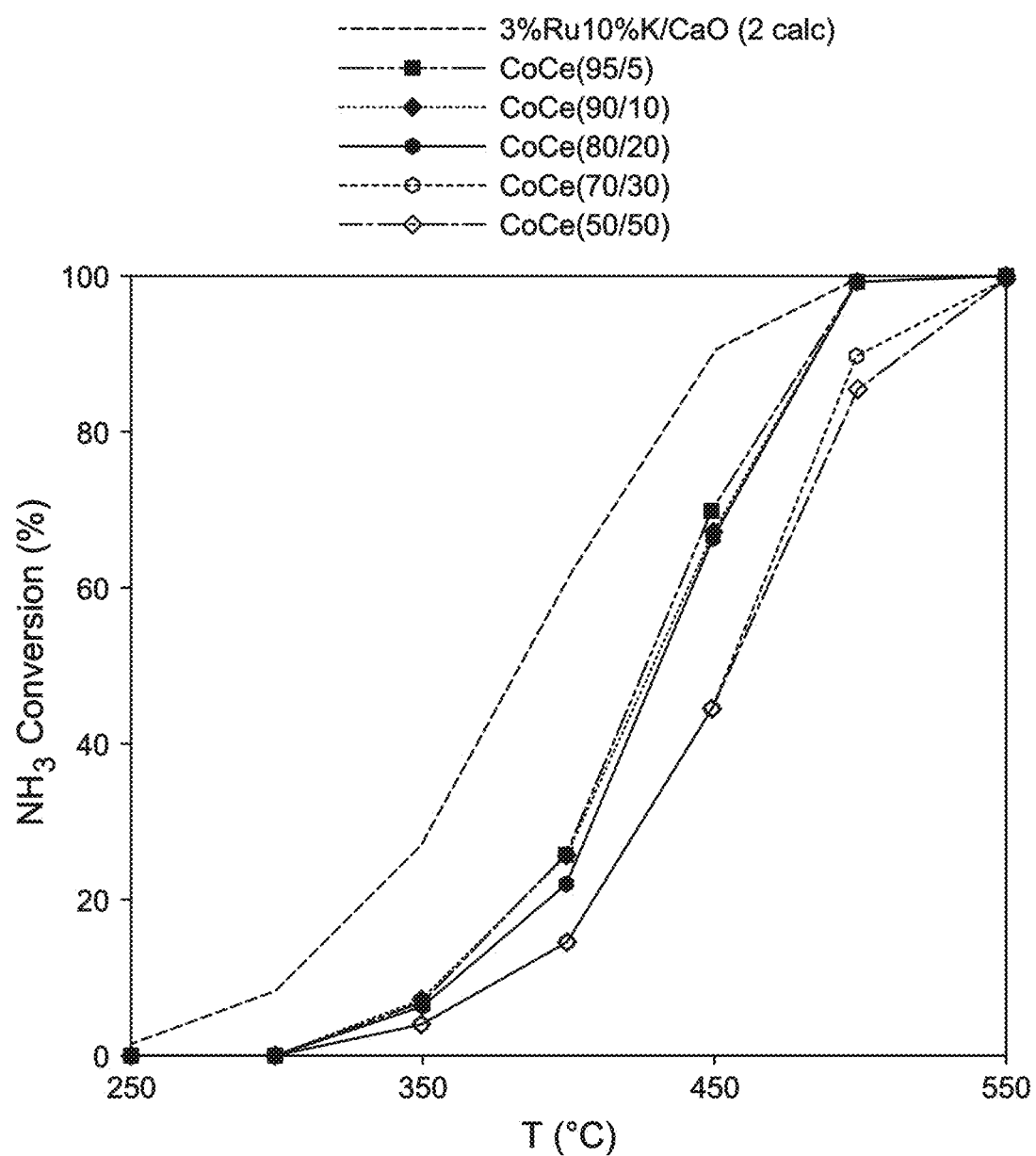
FIG. 5 is a graph showing the effect of the first Co to Ce ratio.
Figure 6:
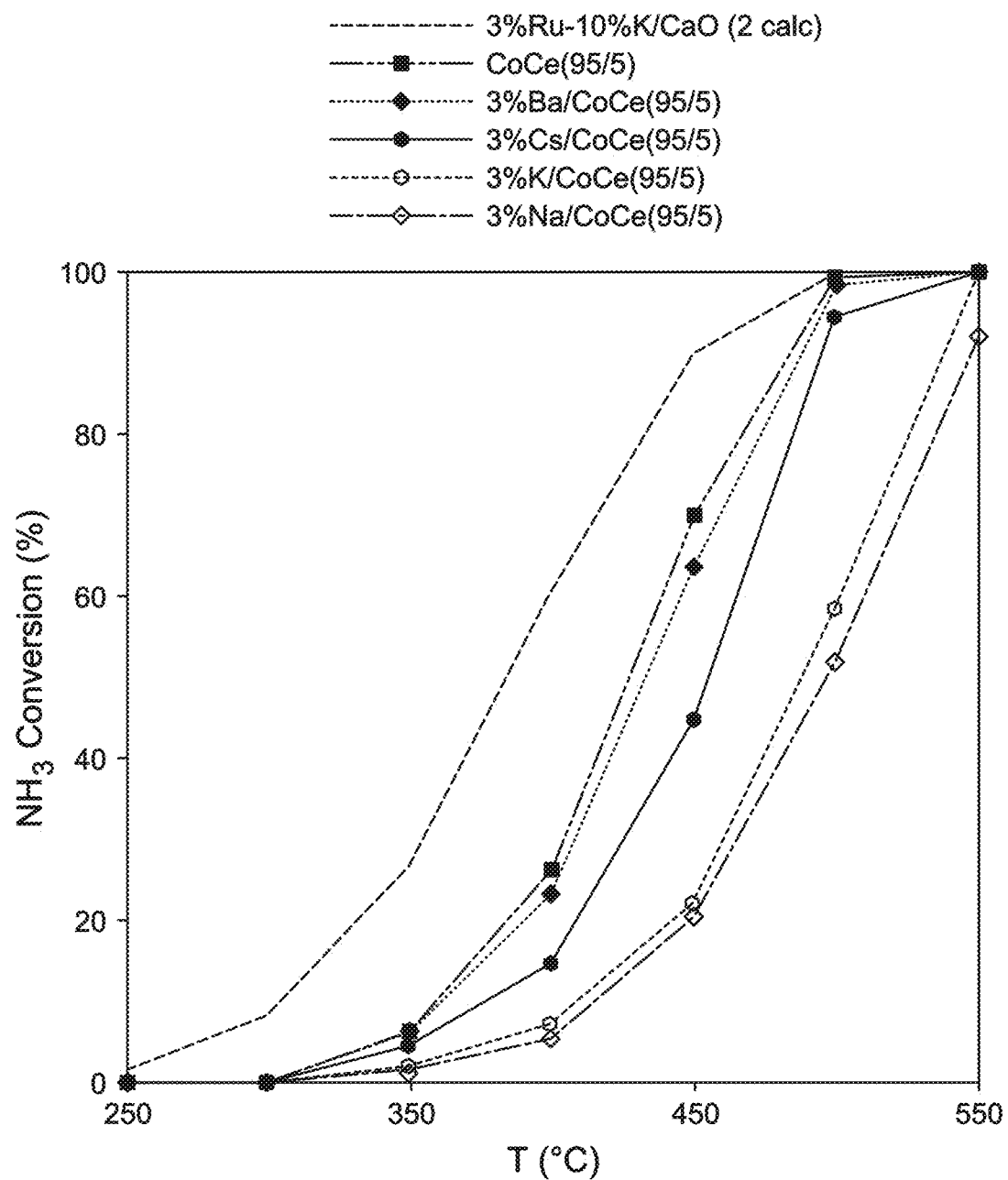
FIG. 6 is a graph showing the effect of second promoters (Ba, Cs, K, Na) in cobalt containing catalysts.
Figure 7:
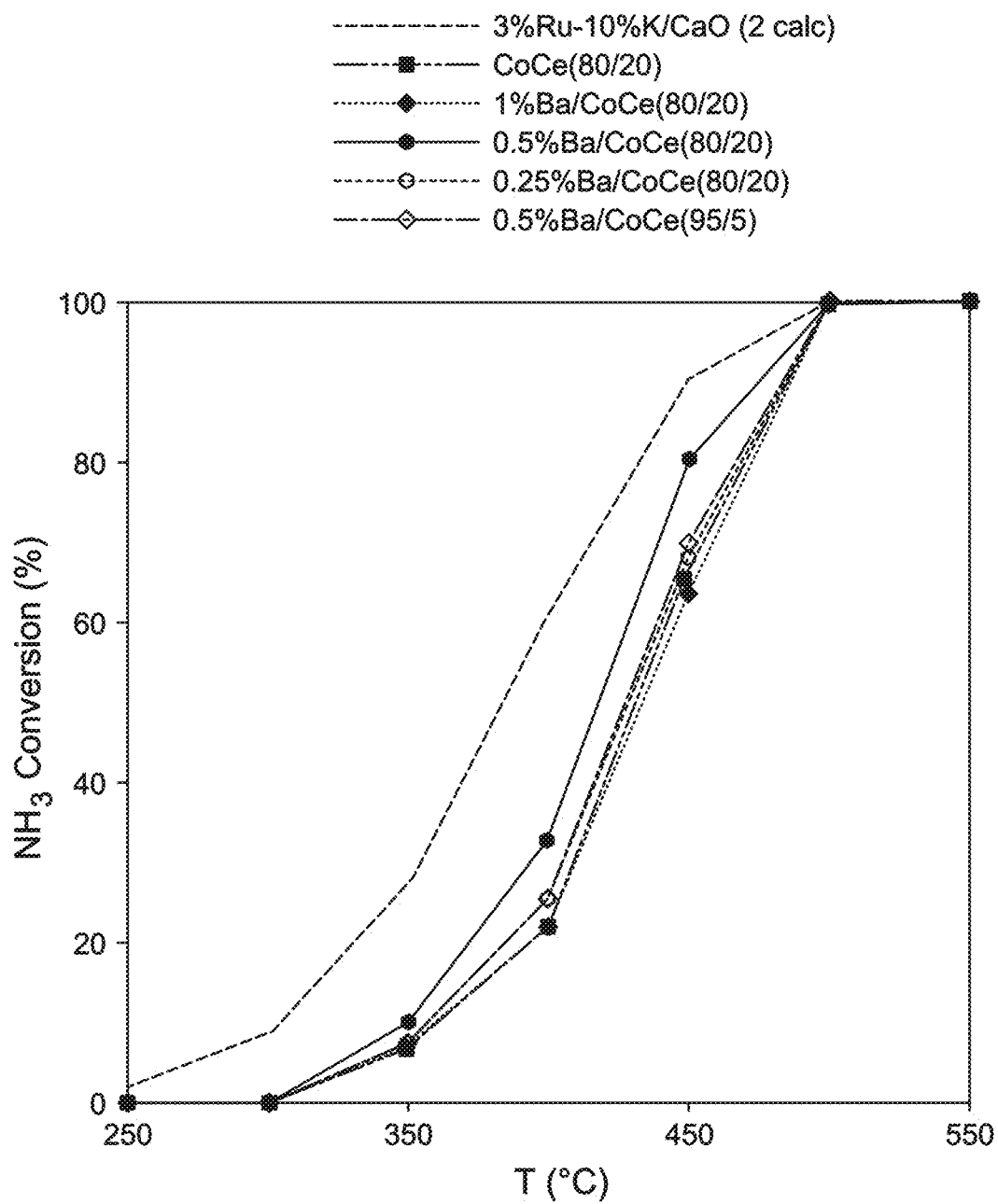
FIG. 7 is a graph showing the effect of the amount of barium in cobalt containing catalysts.
Figure 8:
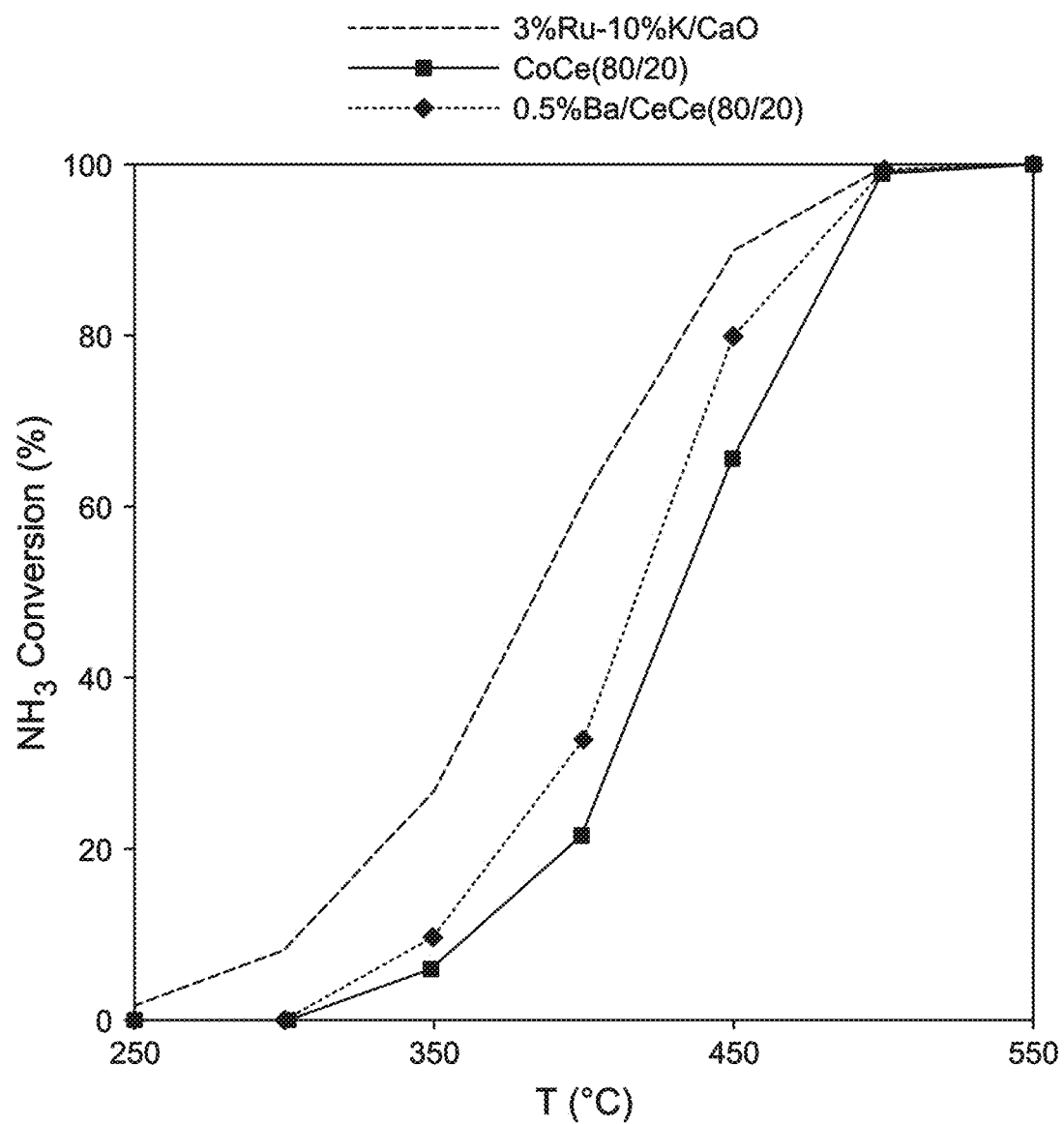
FIG. 8 is a graph showing the effect of barium on a 80% Co-20% Ce.

Example 3 was a test of various cobalt-containing catalysts to show the efficacy of certain promoters compared to a commercially available ruthenium based catalyst. The catalysts were prepared according to a coprecipitation method described in Example 1, where the cerium nitrate hexahydrate was replaced with a salt of the other promoter metals, such as aluminum and calcium. FIG. 4 shows the comparison of the cobalt-containing catalyst with promoters including aluminum, calcium, and cerium to a cobalt catalyst and the commercially available ruthenium based catalyst. The results show that a cobalt-containing catalyst with cerium promoter has the best catalytic performance. FIG. 5 shows the results of various amounts of cerium in a cobalt The results show that catalysts containing 80% Co-20% Ce, 90% Co-10% Ce, and 95% Co-5% Ce performed similarly and had better catalytic performance than 70% Co-30% Ce and 50% Co-50% Ce. FIG. 6 shows a comparison of the cobalt-containing with cerium and other promoters, including barium, cesium, potassium, and sodium. The results show the highest catalytic performance with the catalysts containing barium as an additional promoter. FIG. 7 is a comparison of different amounts of barium in the cobalt-containing catalyst with cerium. The results show that the cobalt-based catalysts have the best catalytic performance. In each of FIGS. 4-7, the best catalytic performance was observed at temperatures greater than 500° C. FIG. 8 shows the results of catalytic performance for a cobalt-containing catalyst with 80% Co and 20% cerium, with and without barium.

Although the embodiments here have been described in detail, it should be understood that various changes, substitutions, and alterations can be made hereupon without departing from the principle and scope of the embodiments. Accordingly, the scope should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the embodiments pertain, except when these references contradict the statements made here.

As used here and in the appended claims, the words "comprise," "has," and "include" and all grammatical variations of the same are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present embodiments.

That which is claimed is:

1. A method for ammonia decomposition to produce hydrogen, the method comprising the steps of:
    introducing a flow of hydrogen gas to the reactor;
    increasing a temperature in the reactor to 500° C. at a rate of 2° C. per minute, wherein the reactor comprises a cobalt-based catalyst, the cobalt-based catalyst comprising:
        15 wt % and 70 wt % of cobalt,
        5 wt % and 45 wt % of cerium, and
        0.4 wt % and 0.5 wt % barium, wherein a remainder of weight of the cobalt-based catalyst is oxygen;
    maintaining the temperature in the reactor at 500° C. for at least 3 hours to activate metal sites on the cobalt-based catalyst;
    introducing an ammonia stream to the reactor, wherein the ammonia stream comprises ammonia;
    contacting the ammonia in the ammonia stream with the cobalt-based catalyst at temperature in a range between 250-700° C. to decompose the ammonia, wherein the cobalt-based catalyst is operable to catalyze an ammonia decomposition reaction;
    catalyzing the ammonia decomposition reaction to cause the ammonia decomposition in the presence of the cobalt-based catalyst to produce hydrogen; and
    withdrawing a product stream from the reactor, the product stream comprising hydrogen.

2. The method of claim 1, wherein a pressure in the reactor is in a range between 1 bar and 40 bar.

3. The method of claim 1, wherein the product stream further comprises nitrogen.

4. The method of claim 1, wherein the conversion of ammonia is greater than 95%.

* * * * *